US012718839B2

(12) United States Patent
Dieny et al.

(10) Patent No.: US 12,718,839 B2
(45) Date of Patent: Aug. 25, 2026

(54) MAGNETO-RESISTIVE READER UTILIZING READ SHIELDS TO MAINTAIN REFERENCE LAYER MAGNETIZATION

(71) Applicant: Headway Technologies, Inc., Milpitas, CA (US)

(72) Inventors: Bernard Dieny, Lans en Vercors (FR); Bor-Yuan Jiang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/144,088

(22) Filed: May 5, 2023

(65) Prior Publication Data

US 2024/0371401 A1 Nov. 7, 2024

(51) Int. Cl.
*G11B 5/39* (2006.01)

(52) U.S. Cl.
CPC .......... *G11B 5/3909* (2013.01); *G11B 5/3912* (2013.01); *G11B 5/3932* (2013.01); *G11B 5/398* (2013.01); *G11B 2005/3996* (2013.01)

(58) Field of Classification Search
None
See application file for complete search history.

(56) References Cited

U.S. PATENT DOCUMENTS 7,199,984 B2 * 4/2007 Carey et al. .......... G11B 5/3903 360/324.2
7,615,996 B1 * 11/2009 Machita et al. ..... G11B 5/3912 428/811.2
8,305,715 B2 * 11/2012 Mauri et al. ......... G11B 5/3912 360/319
8,514,525 B2 * 8/2013 Childress ............. G11B 5/3912 360/324.2
9,251,815 B2 * 2/2016 Singleton et al. ... G11B 5/3912
9,478,239 B2 * 10/2016 Sapozhnikov et al. ...................... G11B 5/3909
9,691,417 B1 * 6/2017 Jung et al. ........... G11B 5/3912
9,799,356 B2 * 10/2017 Okawa et al. ....... G11B 5/3912
10,068,601 B1 * 9/2018 Li et al. ............... G11B 5/3912
2003/0128481 A1 * 7/2003 Seyama et al. ...... G11B 5/3909 360/324.1
2003/0137784 A1 * 7/2003 Noma ...................... G11B 5/39 360/324.11
2010/0079917 A1 * 4/2010 Miyauchi et al. ... G11B 5/3912 360/319
2010/0103562 A1 * 4/2010 Machita et al. ..... G11B 5/3912 360/313

(Continued)

*Primary Examiner* — Craig A. Renner
(74) *Attorney, Agent, or Firm* — DLA Piper LLP (US)

(57) ABSTRACT

The present embodiments relate to magneto-resistive read heads that can utilize read shields to maintain a reference layer magnetization. A magneto-resistive head can include a first shield and a second shield disposed adjacent to the first shield, with a distance between the shields forming a read gap. The magneto-resistive head can also include a first spacer layer disposed in the read gap. The magneto-resistive head can also include a first reference layer disposed in the read gap adjacent to the first spacer layer. A first reference layer magnetization direction can be set based at least by a first shield magnetization direction. The magneto-resistive head can also include a sense layer disposed in the read gap between the first spacer layer and the second shield.

5 Claims, 12 Drawing Sheets

(56) References Cited

U.S. PATENT DOCUMENTS

| | | | | |
|---|---|---|---|---|
| 2015/0002964 | A1* | 1/2015 | Sapozhnikov et al. ...................... | G11B 5/3912 360/319 |
| 2017/0249959 | A1* | 8/2017 | Bertero et al. ....... | G11B 5/3912 |

* cited by examiner

MAGNETO-RESISTIVE READER UTILIZING READ SHIELDS TO MAINTAIN REFERENCE LAYER MAGNETIZATION

TECHNICAL FIELD

Embodiments of the invention relate to the field of electro-mechanical data storage devices. More particularly, embodiments of the invention relate to the field of a magneto-resistive readers in hard disk drives for reading a state of magnetic bits written to a magnetic recording medium.

BACKGROUND

A magnetic recording medium (e.g., a magnetic disk) can store magnetic bits representing digital data. A magneto-resistive reader can be part of a hard disk drive (HDD) to read a state of the magnetic bits and read the digital data stored on the disk.

Various techniques can be implemented to implement a magneto-resistive reader, such as tunnel magneto-resistance (TMR) of magnetic tunnel junctions (MTJ), for example. These techniques can implement a sense layer with magnetization rotating under the influence of a magnetic field directed from the magnetic recording medium and a reference layer of fixed magnetization. The magnetic layers can be separated by a tunnel barrier, which can comprise a material such as magnesium oxide (MgO), for example. A change in a relative orientation of the magnetization of the sense layer and the reference layer can produce a TMR signal.

SUMMARY

The present embodiments relate to magneto-resistive read heads that can utilize read shields to maintain a reference layer magnetization. A first example embodiment provides a magneto-resistive head. The magneto-resistive head can include a first shield and a second shield disposed adjacent to the first shield. The first shield and the second shield can include a magnetic material. A distance between the first shield and the second shield can form a read gap. The magneto-resistive head can also include a first spacer layer disposed in the read gap. If the magneto-resistive head uses tunnel magnetoresistance, the first spacer layer can include a tunnel barrier. Further, if the magneto-resistive head uses giant magnetoresistance, the first spacer layer is metallic.

The magneto-resistive head can also include a first reference layer disposed in the read gap adjacent to the first non-magnetic spacer layer. In some instances, the first reference layer comprises the first shield. In other instances, the first reference layer includes a polarization layer comprising a first metallic alloy comprising Boron or a second metallic alloy comprising an amorphizing element. Further, a first reference layer magnetization direction can be set based at least by a first shield magnetization direction.

The magneto-resistive head can also include a sense layer disposed in the read gap between the first spacer layer and the second shield. The sense layer can include a bias magnetization direction. The bias direction can be around 45° or 135° or −45° or −135° relative to the first shield magnetization direction. In some instances, the bias direction is set at least by a coupling between the sense layer and the first reference layer, and a magnetic field generated by a permanent magnet disposed in the read gap.

In some instances, magneto-resistive head can include a second spacer layer disposed in the read gap adjacent to the sense layer. In such instances, the magneto-resistive head can also include a second reference layer disposed in the read gap between the second spacer layer and the second shield. A second reference layer magnetization direction can be set at least by a second shield magnetization direction.

In some instances, the magneto-resistive head can further include a coupling layer disposed between the first shield and the first reference layer. The coupling between the sense layer and the first reference layer can be modified by the coupling layer. For instance, the coupling layer can produce a Ruderman-Kittel-Kasuya-Yosida (RKKY) interlayer coupling between the first shield and the first reference layer. In some instances, the coupling layer can be recessed within the first shield.

In a second example embodiment, a head for interacting with a magnetic recording medium is provided. The head can include a first shield and a second shield disposed adjacent to the first shield. Each of the first shield and the second shield can include a magnetic material. Further, a distance between the first shield and the second shield can form a read gap. The head can also include a first magneto-resistive layer disposed in the read gap. The first spacer layer can comprise a tunnel barrier or a metallic layer. Further, a magnetization direction of a first reference layer can be set based at least by a first shield magnetization direction. The head can also include a sense layer disposed in the read gap between the first spacer layer and the second shield.

In a third example embodiment, a magneto-resistive head is provided. The magneto-resistive head can include a first shield and a second shield disposed adjacent to the first shield. A distance between the first shield and the second shield can form a read gap. The magneto-resistive head can also include a first spacer layer disposed in the read gap and a first reference layer disposed in the read gap adjacent to the first spacer layer. A first reference layer magnetization direction can be set based at least by a first shield magnetization direction. The magneto-resistive head can also include a sense layer disposed in the read gap between the first spacer layer and the second shield.

The magneto-resistive head can also include a second spacer layer disposed in the read gap adjacent to the sense layer. The magneto-resistive head can also include a second reference layer disposed in the read gap between the second spacer layer and the second shield. A second reference layer magnetization direction is set at least by a second shield magnetization direction.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
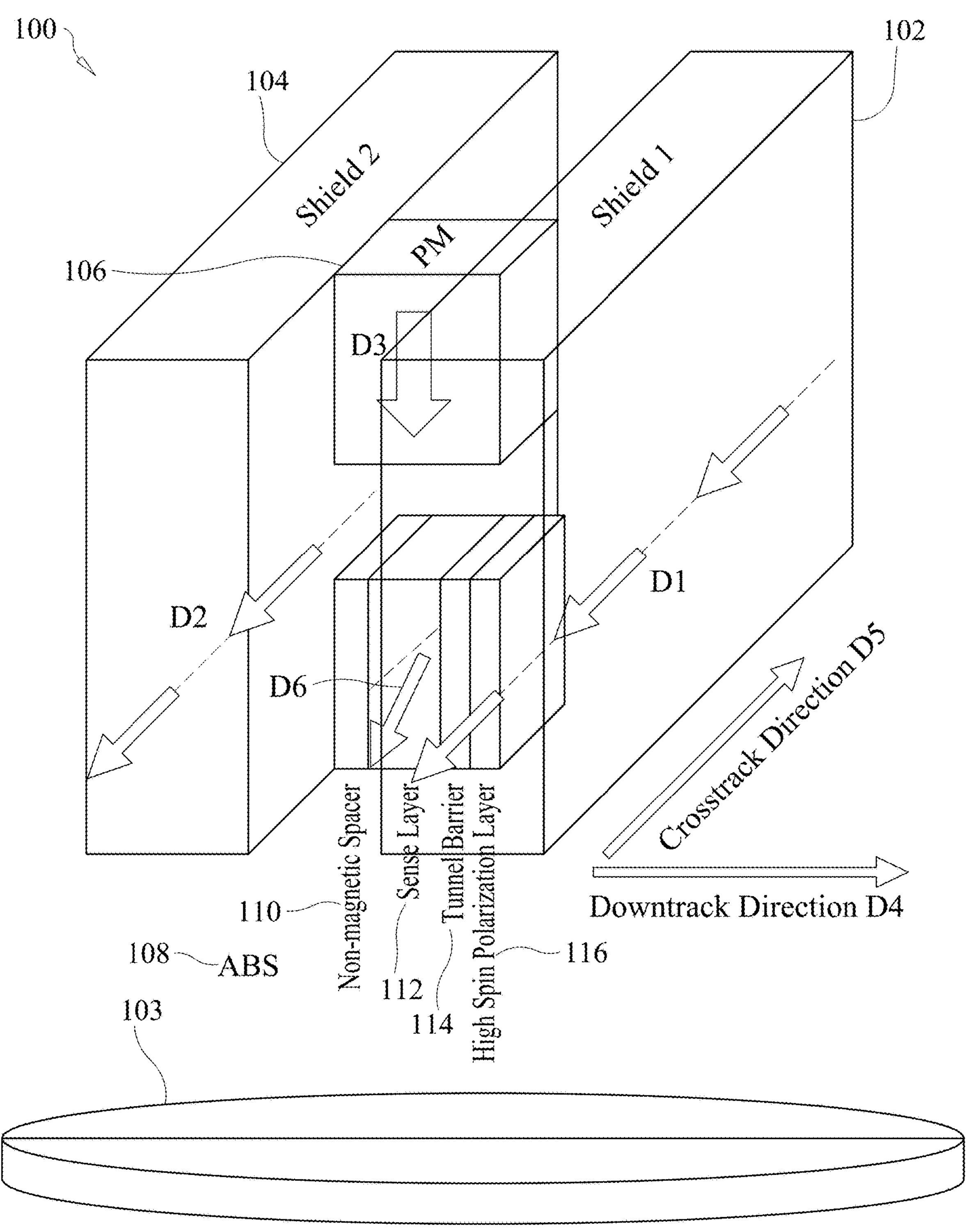
FIG. 1 illustrates an example magneto-resistive head according to an embodiment.

A hard disk drive (HDD) can include a magneto-resistive (MR) reader to read a state of the magnetic bits stored on the disk. Various techniques can be implemented by the magneto-resistive reader to read the magnetic bits on the disk, such as tunnel magnetoresistance (TMR) of magnetic tunnel junctions (MTJ), for example. These techniques can implement a sense layer with magnetization rotating under the influence of a magnetic field directed from the magnetic recording medium and a reference layer of fixed magnetization.

The reference layer can be pinned in a direction roughly parallel to a field that is to be measured (e.g., a field perpendicular to the disk). This pinning can be achieved by coupling the reference layer to a synthetic antiferromagnetic layer that is pinned to an antiferromagnetic (e.g., Ir20Mn80) pinning layer.

A magneto-resistive device can be inserted between two shields comprising a soft magnetic material to absorb a flux from further bits down track such that the magneto-resistive sensor primarily detects a magnetic flux from a bit located directly under the magneto-resistive sensor at an air-bearing surface (ABS). A soft magnetic material can include a magnetic material having low anisotropy and low coercivity, such as a material with an anisotropy field below 40 mT and coercive field below 5 mT. A spacing between the shields can be a critical parameter that can influence MR head performance, as the spacing can determine a down track resolution and, therefore, a maximum kilo flux change per inch (KFCI) that the head can read. A shorter gap length in a down track direction can result in a larger maximum KFCI that the reader can read.

To this end, an attempt can be made to reduce the gap length without comprising the amplitude and noise of a readout signal. The thickness of each layer in the stack may be reduced as much as possible, and a recessed pinning layer can be recessed by recessing the antiferromagnetic pinning layer away from the ABS to reduce the total thickness of the stack next to the ABS. However, it generally can be difficult to further reduce read gap length without any significant modification to a design of a read head.

The present embodiments relate to removing a pinned reference layer within a MTJ stack by using one or both shields to maintain a magnetization of the reference layer. At least one shield can be sufficiently stiff to maintain the magnetization of the reference layer in an approximately fixed direction even if its magnetization rotates a few degrees, such as less than plus or minus 15 degrees, during the read operation due to a varying stray field from the magnetic recording medium. This can be achieved by increasing the shield anisotropy in the cross-track direction to anisotropy field value of the order of 40 mT. The read gap may include the sense layer and two spacers between the sense layer and the shields. The spacers can be used to magnetically decouple the different magnetic layers of the magnetoresistive device and/or to transmit the spin-polarized current between the sense layer and the reference layer thus providing the magnetoresistive signal. These spacer layers can include tunnel barriers (e.g., a MgO barrier) if TMR is used, or non-magnetic metallic spacers (e.g., Copper (Cu) or Tantalum (Ta) spacers) if GMR is used, or one tunnel barrier and one non-magnetic metallic spacer.

The shields can be used as reference layers. In some embodiments, it can be preferable to have a high spin polarization layer acting as a reference layer disposed between the shield and a non-magnetic metallic spacer to enhance the magneto-resistive signal and provide more flexibility on the magnetic orientation of the reference layer. As a result of the absence of pinning antiferromagnetic and synthetic antiferromagnetic layers, the read gap length can be reduced to values of the order of 10 nanometers (nm) or less based on the thickness of the sense layer. The read gap length can be decreased (e.g., by about half) compared to the gap length in other prior art magneto-resistive heads. This length reduction can provide an increase in readout down-track resolution (e.g., in KFCI) and also cause a gain in a cross-track resolution by reducing the flux captured by the sensor from neighboring tracks thereby also increasing a kilo track per inch (KTPI).

In a first example embodiment, a shielded magneto-resistive head can be provided. The head can be based on a tunnel magneto-resistance or giant magneto-resistance. The head can include a first magneto-resistive element including a first tunnel junction or a first spin-valve. A direction of magnetization of a first reference layer of the first magneto-resistive element can be set by a magnetization of a first shield disposed adjacent to the read gap. The magnetization of the first shield can include strong exchange interaction with the magnetization of the first reference layer.

In some embodiments, the first shield can be stiffer than the second shield, the shields forming a read gap. In some instances, the magneto-resistive head can include a second magnetic tunnel junction or a second spin-valve. A second reference layer magnetization direction can be set by a direction of magnetization of the second shield (e.g., on the side of the read gap opposite to the first shield) to which the second reference layer magnetization is in strong exchange-like interaction.

The sense layer can be biased at around 45° or 135° or −45° or −135° to the magnetization orientation of the first shield in close proximity to the read-gap. In some instances, the bias direction of the sense layer magnetization can result from a balance between an interlayer coupling of the sense layer with the reference layer through a non-magnetic spacer layer (e.g., a tunnel barrier if the head includes a magnetic tunnel junction or a non-magnetic spacer including a material such as gold (Ag) or copper (Cu) if the head includes a spin-valve), to the bias field from the surrounding shields and from a stray field created by a neighboring permanent magnet.

In some instances, the bias direction of the sense layer magnetization can result from the influence of both the interlayer coupling of the sense layer with the first reference layer through the first non-magnetic spacer layer (e.g., a tunnel barrier if the head includes a magnetic tunnel junction or a non-magnetic spacer including a material such as gold (Ag) or copper (Cu) if the head includes a spin-valve), and from the interlayer coupling of the sense layer with the second reference layer through the second non-magnetic spacer. In some instances, the interlayer coupling between the sense layer and the second reference layer can be adjusted by inserting a thin layer of an alloy comprising iron and ruthenium (e.g., FeRu) of a specific thickness and composition to produce a Ruderman-Kittel-Kasuya-Yosida (RKKY) interlayer coupling whose angle and amplitude are such that the net biasing direction of the sense layer magnetization is set close to any of 45° or 135° or −45° or −135° to the magnetization of the shield in close proximity of the read-gap.

In the present embodiments, the direction of magnetization of the reference layers generally approximately remains in the plane of the layers. The first reference layer can be tilted away from the cross-track direction and brought closer to the direction perpendicular to the media which corresponds to the direction of the magnetic field from the media to be sensed. If a second reference layer is used, the direction of magnetization of the second reference layer also remains approximately in the plane of the layers but can be tilted away from the cross-track direction away from the cross track direction towards the direction perpendicular to the media. The tilt of magnetization of the reference layer(s) can be realized by inserting, at the interface between the reference layer(s) and the shield(s) or inside the shield(s) at a distance between 1 and 5 nm from the interface with the reference layer, a thin layer of an alloy such as FeRu of a proper thickness and composition capable of producing a RKKY interlayer coupling chosen in angle and amplitude such that the reference layer magnetization is set away from the cross track direction and approximately along the direction perpendicular to the media. In all instances, the sense layer can be biased in such a way and the fly height is adjusted so that R(H) characteristics of the sensor remains monotonous over the dynamic range of the sensor in operation.

The magneto-resistive (MR) head as described herein may not include any antiferromagnetic layer or any synthetic antiferromagnetic layer inserted in the MR pillar. Further, the distance between shields in the MR head can be reduced as described herein.

In prior art cases, read heads do not use the shields to define the magnetization of the reference layer. In these cases, the read heads may include a pinned reference layer which is inserted in the read gap together with the sense layer and the non-magnetic spacer layer separating them. This pinned reference layer can comprise a composition of IrMn 6 nm/CoFe 2.5 nm/Ru0.8 nm/CoFe 2 nm. In some instances, removing this layer (otherwise called a synthetic antiferromagnetic pinned layer) can save about 11 nm in read gap width or less if the antiferromagnetic layer is recessed.

FIG. 1 illustrates an example magneto-resistive head 100 according to the present embodiments. As shown in FIG. 1, the MR head 100 can have a reference layer magnetization direction D1 set by strong interlayer coupling with the shield 1 magnetization D1 without requiring a synthetic antiferromagnetic pinning layer.

In the embodiment as shown in FIG. 1, the magnetoresistive head can include shields 102, 104 and a permanent magnet (PM) 106 disposed between the shields 102, 104. A bottom surface adjacent to a magnetic recording medium (e.g., a disk 103) can form an air-bearing surface (ABS) 108.

The MR head 100 can further include a single magnetic tunnel junction (MTJ) including multiple layers. For example, the MTJ can include a non-magnetic spacer 110, sense layer 112, tunnel barrier 114, and a high spin polarization layer 116. The MTJ can be disposed between the shields 102, 104 below the PM 106.

The tunnel barrier 114 can be made of a material such as MgO to form a MgO-based magnetic tunnel junction providing large magnetoresistance amplitude. The oxide tunnel barrier could be made of other oxides, such as aluminum oxide (AlOx), titanium oxide (TiOx), zinc oxide (ZnOx), hafnium oxide (HfOx), or any combination of oxides. The tunnel barrier 114 can include a nitride barrier such as aluminum nitrate (AlN) or of other materials providing a tunnel magnetoresistance, such as scandium nitrate (ScN).

If the tunnel barrier 114 comprises MgO, the sense layer 112 can include an iron cobalt and boron (FeCoB) layer in contact with the tunnel barrier 114 or a composite layer comprising a FeCoB layer associated with a FeCo layer without an amorphising element (e.g., Boron) in contact with the tunnel barrier 114. The sense layer 112 can also include a layer of an element able to absorb the Boron away from the FeCoB layer during a post-deposition annealing, disposed a few nanometers away from the tunnel barrier. The post-deposition annealing can improve a crystallization of the tunnel barrier and induce the crystallization of the initially amorphous FeCoB-based layer.

A thickness of the sense layer 112 can be between 1.5 nm and 10 nm. If the sense layer is less than 1.5 nm thick, the magnetization can be prone to thermal fluctuations that can create magnetic noise in the readout signal. Further, if the sense layer is thicker than 10 nm, this can excessively increase the read-gap length. In the proposed embodiments, the gap length (e.g., a gap between shields 102, 104) is reduced compared to prior art magnetoresistive heads due to the absence of pinned layer in the read-gap. Consequently, the sense layer can be thicker than in prior art heads which will result in minimizing the thermally induced magnetic noise. The sense layer thickness can include a thickness between 5 and 7 nm, decreasing the thickness as the requirement on KFCI increases.

On an opposing side of the tunnel barrier 114, a thin layer of high spin polarization material 116 can be disposed between the tunnel barrier 114 and the first shield 102. The high spin polarization material 116 can include a FeCoB alloy if MgO is used as tunnel barrier. The high spin polarization material 116 can include an alloy based on iron, cobalt, and nickel (FeCoNiX) poor in Ni, and where X represents an amorphizing element such as for example niobium (Nb), zirconium (Zr), or hafnium (Hf).

The high spin polarization material 116 can have a strong exchange coupled to the magnetization of the first shield 102 adjacent to the read gap. This layer can have a thickness of a range between 1.5 to 3 nm and may be separated from the first shield by an ultrathin layer (not shown) of an element able to absorb the B or other amorphizing element upon post-deposition annealing. Examples of elements able to absorb B or other amorphizing elements can include tantalum (Ta), tungsten (W), or molybdenum (Mo). This layer can have a thickness in the range 0.2 nm to 0.5 nm. The ultrathin layer can have a thickness to properly absorb the amorphizing element but not too thick so that strong interlayer magnetic coupling is maintained through it. The high spin polarization layer 116 can play the role of the reference layer and can be strongly exchange coupled to the shield magnetization across this ultrathin B (or X) absorbing layer. The magnetization of this layer can be sufficiently coupled to the shield magnetization D1 so that the high spin polarization material layer does not significantly oscillate under the influence of the field from the media.

On the opposite side of the sense layer 112, there can include a non-magnetic metallic spacer 110. The spacer 110 can include W, Ta, or Mo. The spacer 110 can decouple the sense layer 112 from the second shield magnetization D2 while allowing the current to flow from one shield to the other.

Figures 2A, 2B, 2C:
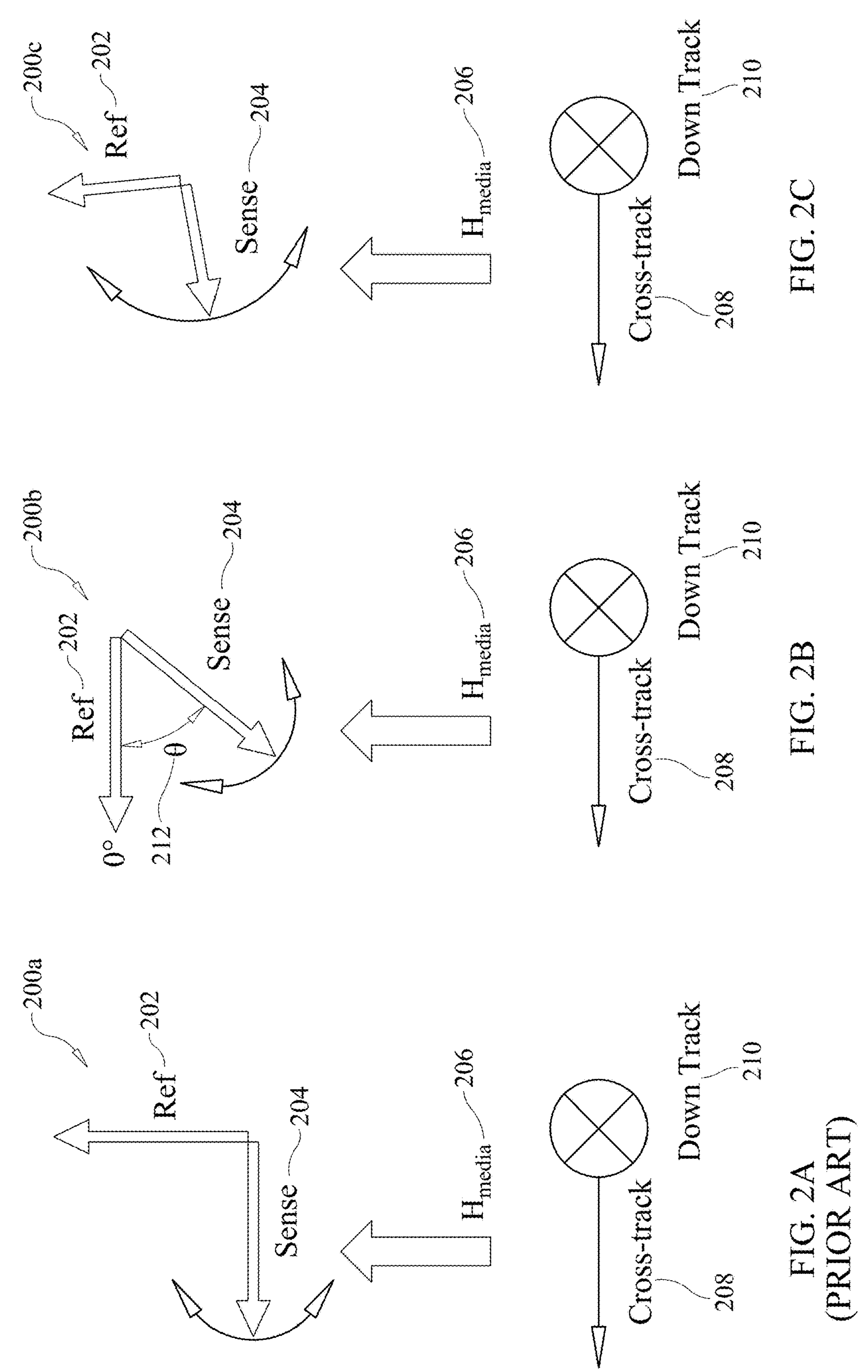
FIG. 2A illustrates a prior art magnetization pattern of the reference layer.
FIG. 2B illustrates a magnetization pattern of a reference layer according to a first example embodiment.
FIG. 2C illustrates a magnetization pattern of a reference layer magnetization according to a second example embodiment.

The magnetization direction of a sense layer and/or a reference layer can be represented relative to a down track direction (e.g., D4 in FIG. 1, 210 in FIGS. 2A-2C) and a cross track direction (e.g., D5 in FIG. 1). FIGS. 2A-2C illustrate examples of magnetization of a sense layer and reference layer in MR heads.

FIG. 2A illustrates a prior art magnetization pattern 200*a* of the reference and sense layer. As shown in FIG. 2A, in prior art cases, the reference layer magnetization 202 is set in the direction perpendicular to the plane of the media which corresponds to the direction of the field from the media to be sensed (206). In contrast, the magnetization of the sense layer 204 is biased substantially along the cross-track direction (208) and rotates upwards or downwards around this direction depending on the field 206 to be sensed.

FIG. 2B illustrates a magnetization pattern 200*b* of a reference and sense layers according to a first example embodiment. As shown in FIG. 2B, the reference layer magnetization 202 can be coupled to the shield and therefore can most commonly lie along (or substantial parallel with) the cross-track direction 208. In the embodiment in FIG. 2B, the sense layer magnetization 204 can no longer be biased in the cross-track direction 208 as in FIG. 2A because the magneto-resistive element should then operate around the parallel or antiparallel magnetic configurations corresponding to a minimum or a maximum resistance. The readout signal would then have an even response to the field from media (e.g., field 206) with poor sensitivity. Accordingly, the sense layer magnetization 204 can be biased around 30 to 45° (e.g., angle θ 212) to the reference layer magnetization 202 and can rotate under the influence of the field from the media 206 in an angular excursion which may not exceed between 0° and 90° to the magnetization of the reference layer 202. This particular biasing of the sense layer can be realized at least in part due to the stray field from the permanent magnet (106) as represented in FIG. 1. The permanent magnet can be magnetized in the direction D3 which is roughly perpendicular to the plane of the media and its magnetization is adjusted so that its stray field pulls the magnetization of the sense layer downwards (or upwards) by 30 to 45°.

Therefore, in the embodiment as shown in FIG. 2B, the sensor may only use half of the magnetoresistance amplitude with a reduced gap length. The bias orientation can be similar to that which was used in anisotropic MR heads (AMR) where the magnetization may be biased at 45° from the current direction.

FIG. 2C illustrates a magnetization pattern 200*c* of a reference and sense layers magnetization in a second example embodiment. As shown in FIG. 2C, the reference layer magnetization is brought closer to the direction perpendicular to the media as in the situation described in FIG. 2A. As a result, the non-linearity of the magneto-resistive head is reduced enabling a wider angular rotation of the sense layer magnetization 204 as compared to the situation described in FIG. 2B.

FIG. 3A-3D can provide various magnetic field characteristics of magneto-resistive heads R(H). The value h can include a field from the media (e.g., disk) that can be normalized by a value to rotate the sense layer magnetization by +45°.

Figures 3A, 3B:
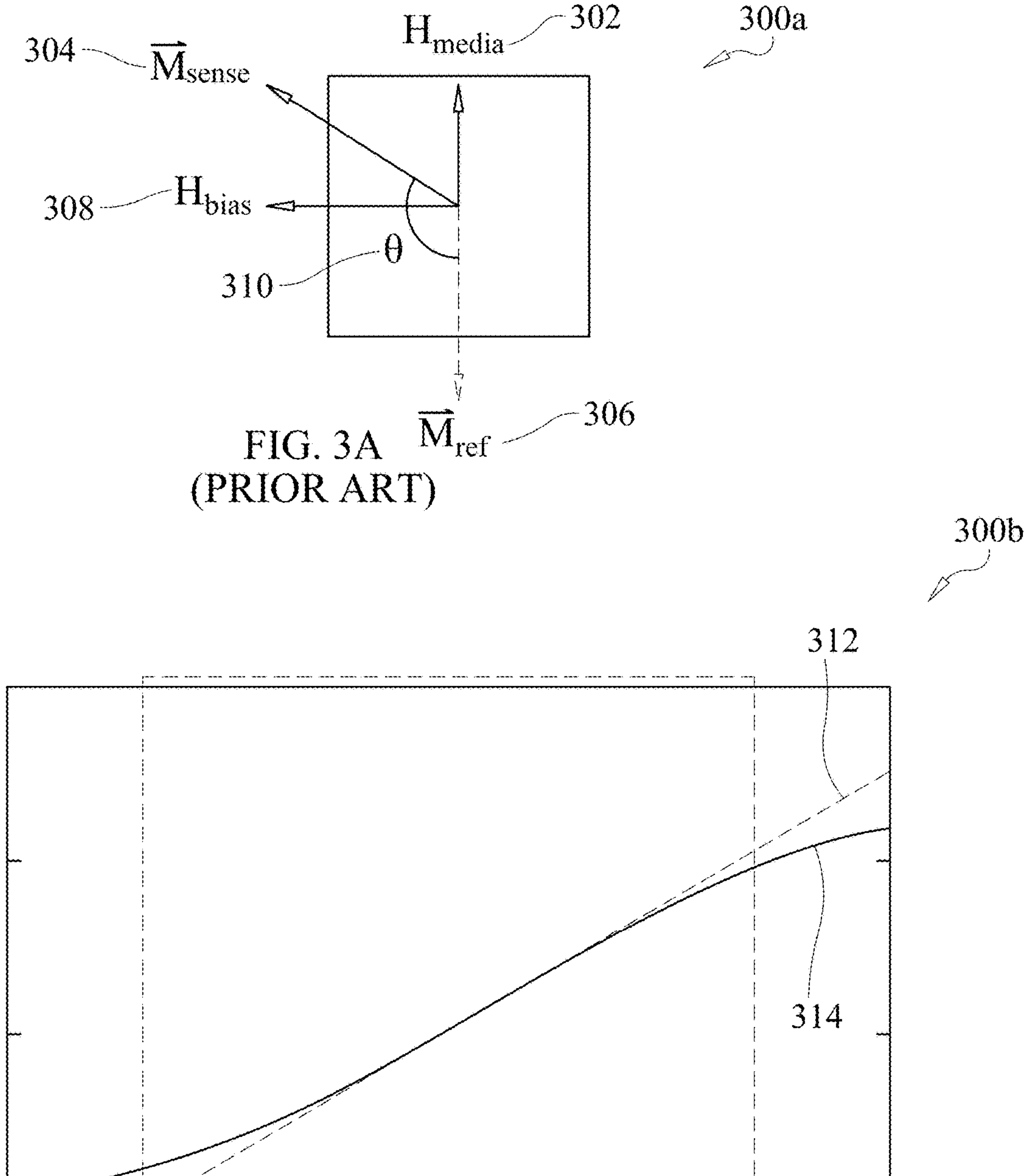
FIG. 3A provides a graphical representation of a prior art example magnetization of a MR head.
FIG. 3B provides a graphical representation of a prior art head resistance variation with a field amplitude.

FIG. 3A provides a graphical representation 300*a* of an example magnetic configuration of a MR head as in prior art. As shown in FIG. 3A, the reference layer magnetization is set roughly along the direction perpendicular to the media which corresponds to the direction of the magnetic field to be sensed from the media. The sense layer 304 is biased by a bias magnetic field 308 roughly oriented in the perpendicular direction i.e. along the cross track direction. An angle between reference layer magnetization 306 and a sense layer magnetization 304 can be represented by angle 310.

FIG. 3B provides a graphical representation 300*b* of an example head resistance variation with a field amplitude for a head biased as represented in FIG. 3A. As shown in FIG. 3B, a variation in the magnetic field to be sensed (e.g., X axis) yields a rotation of the sense layer magnetization of the MR head which yields a change in resistance of the magnetoresistive device (e.g., Y axis). The magnetoresistive response of the magnetoresistive head is represented by the line 314. Line 312 shows the linear extrapolation of the magnetoresistive response of the head with a slope corresponding to the maximum slope (i.e., the maximum in sensitivity) of the actual response shown by line 314.

Figure 3C:
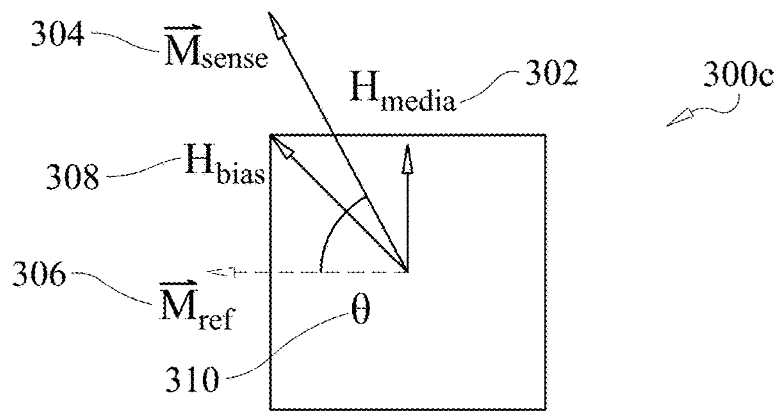
FIG. 3C provides a graphical representation of an example magnetization of a MR head according to a first example embodiment.

FIG. 3C provides a graphical representation 300*c* of an example magnetization of a MR head according to a first example embodiment. As shown in FIG. 3C, the reference layer magnetization can be biased by exchange interaction with the shield magnetization and is therefore oriented in a direction roughly corresponding to the D1 direction of FIG. 1. As a result, the magnetic field of a media 302 to be sensed is now directed roughly perpendicular of the reference layer magnetization 306. In this configuration, a bias magnetic field 308 is directed at roughly 45° from the reference layer magnetization as indicated in FIG. 3C to bias the sense layer magnetization so that when the sense layer magnetization rotates due to the variation of field to be sensed, this produces the maximum variation of device resistance. This 45° biasing field can be produced by balancing the stray field from a permanent magnet 106 as represented in FIG. 1 with an interlayer coupling which may exist through the tunnel barrier with the reference layer. An angle between reference layer magnetization 306 and a sense layer magnetization 304 can be represented by angle 310.

Figure 3D:
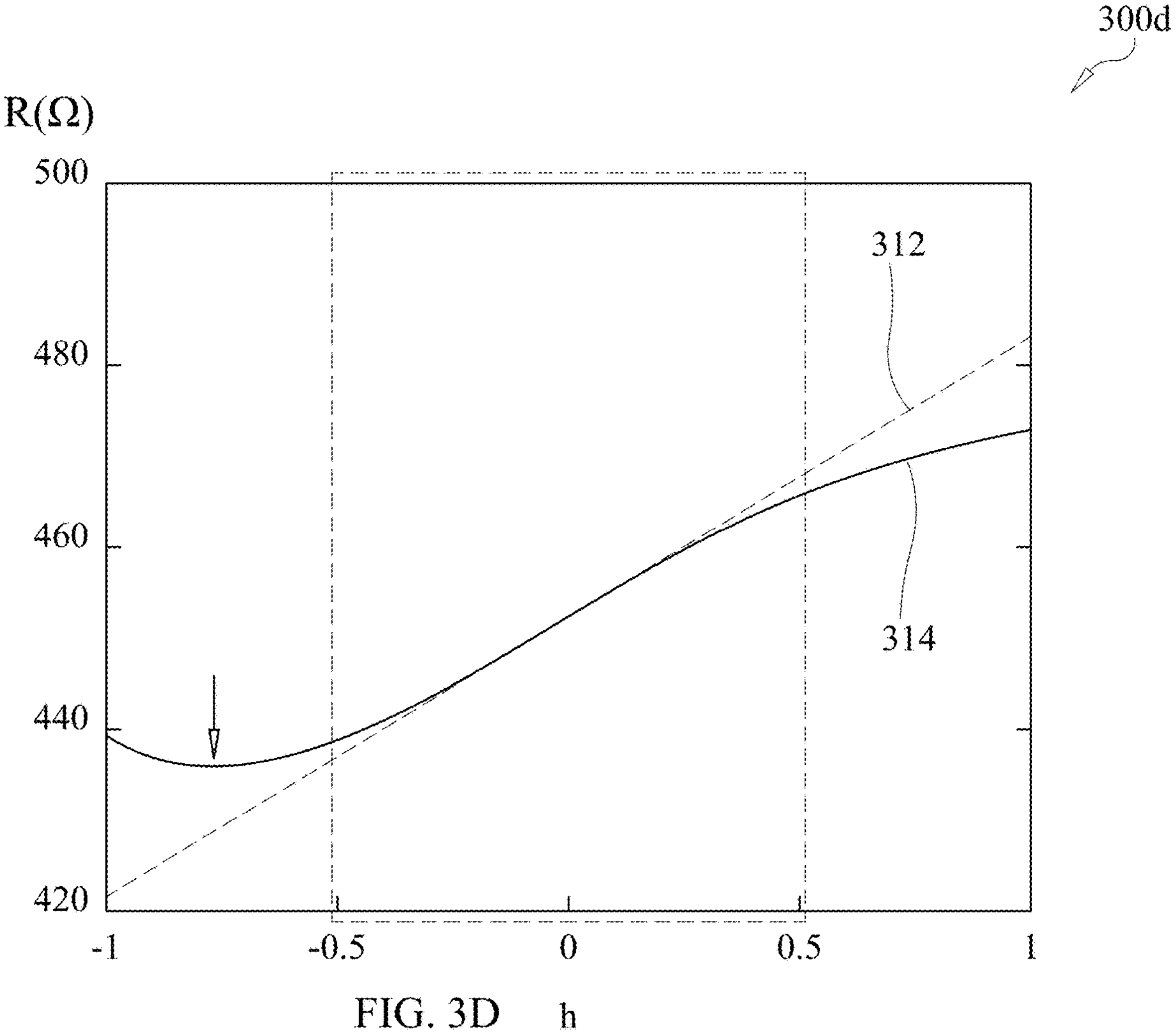
FIG. 3D provides graphical representation of a head resistance variation with a field amplitude for a magneto-resistive head according to the first example embodiment.

FIG. 3D provides a graphical representation 300*d* of head resistance variation with a field amplitude of a magnetoresistive head according to the second example embodiment as represented in FIG. 3C. As shown in FIG. 3D, a variation in the magnetic field to be sensed (e.g., X axis) yields a rotation of the sense layer magnetization which itself produces a variation of resistance of the MR head. This variation of resistance (e.g., Y axis) is represented by the continuous line 314 while the dotted line 312 in FIG. 3D represents the linear extrapolation of the resistance variation with slope corresponding to the maximum slope of line 314. In some instances, limiting the angular dynamic range of the sensor can result in maintaining good linearity, which may cause some signal reduction but can allow for a reduction by half of the read-gap length.

Further, to reduce the non-linearity in a magneto-resistive head as described herein and increase the signal amplitude, the magnetization of the reference layer can be rotated away from the cross-track direction. Correspondingly, the biasing direction of the sense layer magnetization can be rotated towards the cross-track direction so that the device still operates around the maximum of slope of variation of resistance versus field to be sensed. This can bring the sense layer magnetization orientation in a quiescent state closer to perpendicular to the field from the media, i.e., closer to the cross track direction as illustrated in FIG. 2C. This can increase the sensor linearity as well as the allowed angular excursion of the sense layer magnetization. The angular excursion in the rotation of the sense layer magnetization can be defined by a condition that the sensor keeps a monotonous R(H) variation over the sensor angular dynamic range.

For instance, in the embodiment as shown in FIG. 3C, the sense layer magnetization may be unable to rotate more than between −26° and +26°; or the readout signal could lose monotonicity when the angle between sense and reference layers magnetization exceeds −35° (change of monotonicity in the variation of R(h) indicated by a black arrow in FIG. 3D). In contrast, in the embodiment as shown in FIG. 3A, the angular excursion of the sense layer magnetization can be significantly increased without altering the monotonicity of the R(H) response.

Due to a shape anisotropy of a shield, the magnetization of the shield itself next to the ABS may not be able to be rotated away from the cross-track direction without altering significantly the recording process. Therefore, to rotate the direction of the reference layer magnetization, a thin layer of material such as a FeRu alloy can be inserted between the reference layer and the shield to induce a strong RKKY interlayer coupling at any angle between 0 and 180° and, in some instances, roughly 90°, which can maximize the sensor linearity.

Figure 4A:
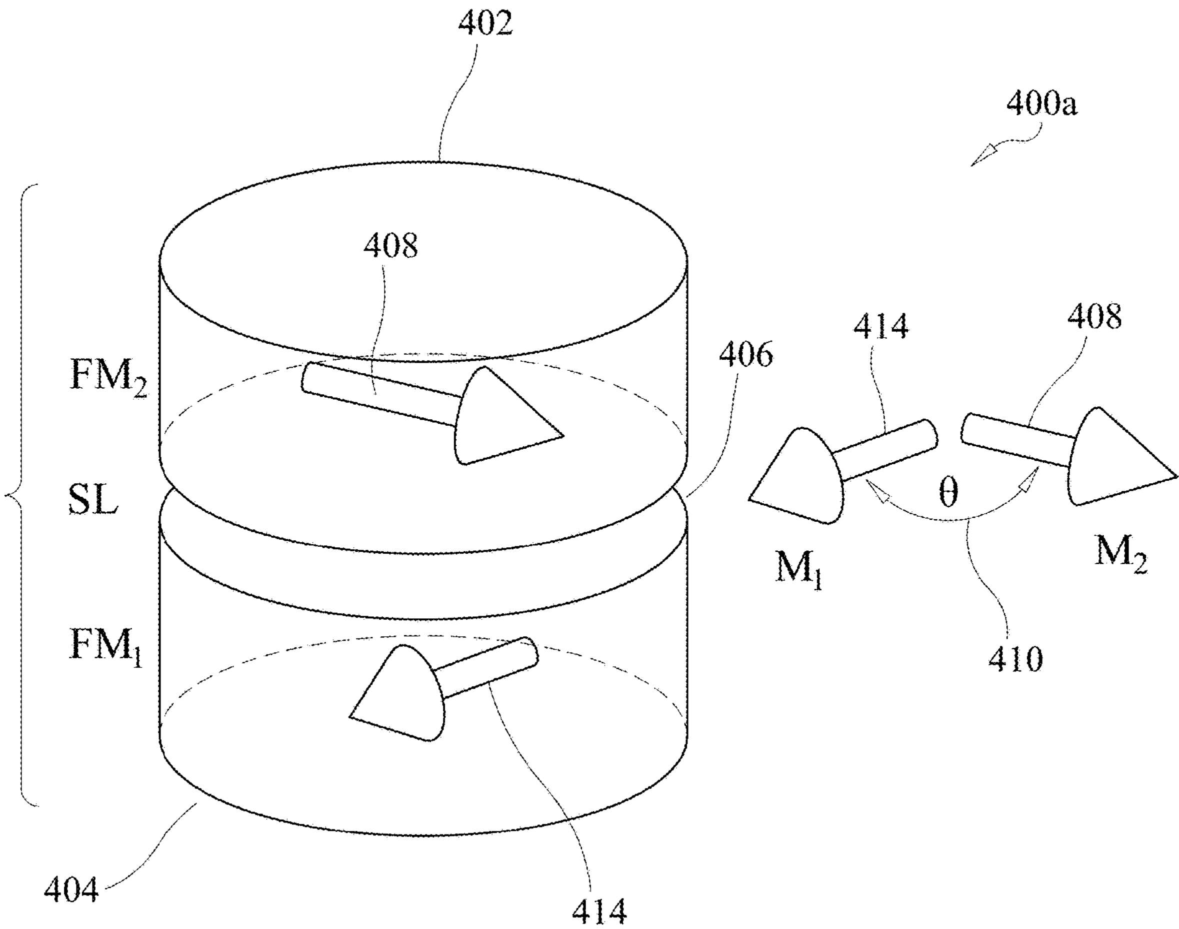
FIG. 4A provides an example sandwich structure comprising two ferromagnetic layers separated by a RKKY coupling layer as used in an embodiment.

FIGS. 4A-4D illustrate various magnetic characteristics of an interlayer coupling through a spacer layer. FIG. 4A provides an example sandwich structure 400*a* comprising two ferromagnetic layers (e.g., 402, 404) separated by a RKKY coupling layer 406 (e.g., FeRu). Further, each two ferromagnetic layers 402, 404 can have a corresponding magnetization direction 414.

FIG. 4A can illustrate the variation of a coupling angle (e.g., 410) between magnetization directions 408, 410 versus film thickness for a number of $Ru_xFe_{(100-x)}$ alloys of various compositions (x=% of Fe in the alloy). The composition $Fe_{78}Ru_{22}$ can be particularly adapted to provide an interlayer coupling close to 90°. This can allow the shield to be magnetized in the cross-track direction while orientating the reference layer magnetization in the direction roughly perpendicular to the media (e.g., along the field to be sensed direction). This can also allow for retrieving the same orientation of magnetization of the reference layer and sense layer as in prior art heads (e.g., as depicted in FIG. 2A) without needing any pinned synthetic antiferromagnetic layer to stabilize the reference layer. Other materials can provide such RKKY coupling at a tunable angle such as RuCo, RuMn, IrCo, or IrFe alloys, for example.

Figure 4B:
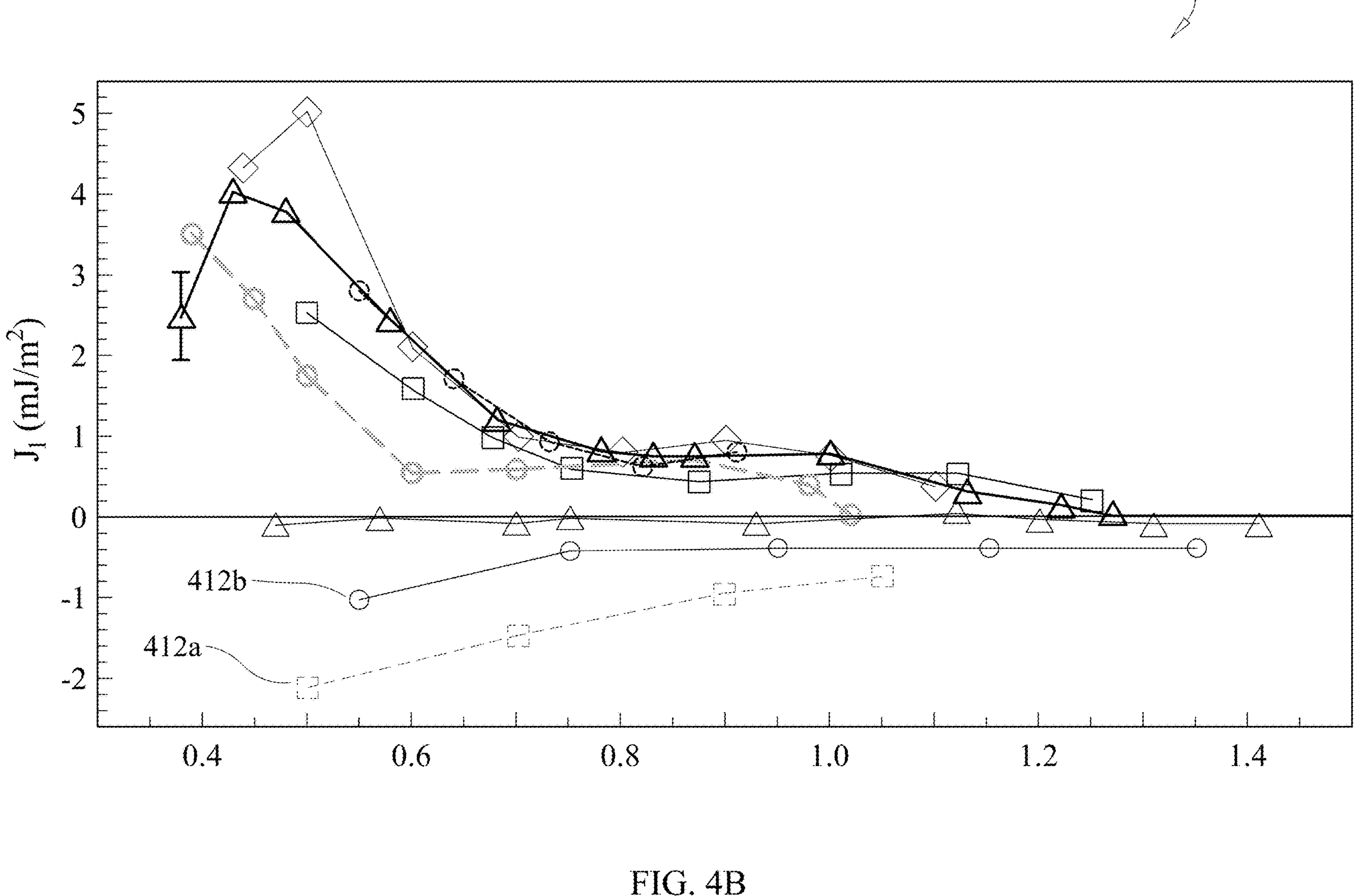
FIG. 4B provides a graphical representation of an example evaluation of the bilinear coupling term with RKKY coupling layer thickness as used in an embodiment.

FIG. 4B provides a graphical representation 400*b* of an example evaluation of the bilinear coupling term with spacer layer thickness. As shown in FIG. 4B, a number of points 412*a*, 412*b* can be provided as a comparison between a thickness of a spacer layer and an energy per square meter.

Figure 4C:
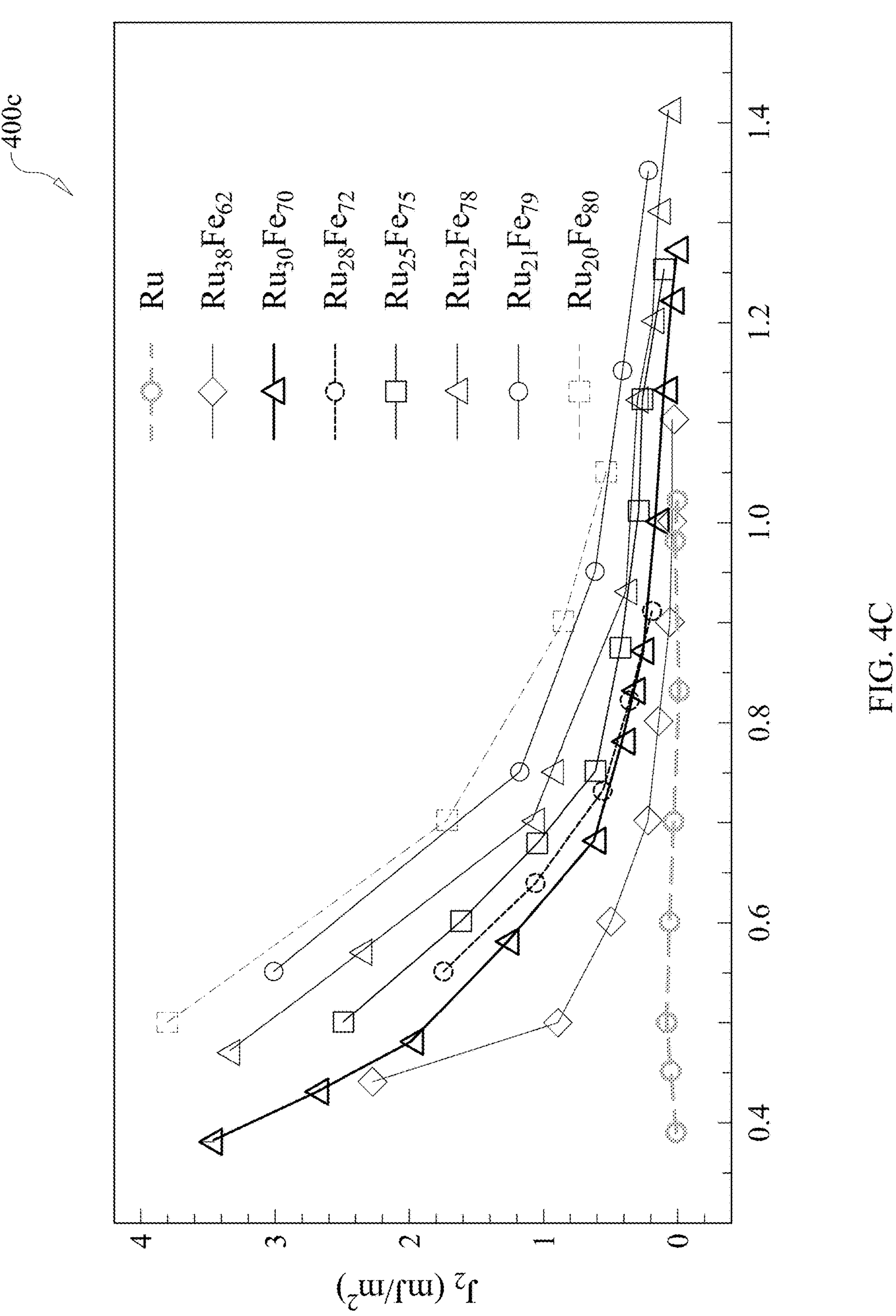
FIG. 4C provides a graphical representation of an evaluation of the biquadratic coupling term with RKKY coupling layer thickness as used in an embodiment.

FIG. 4C provides a graphical representation 400*c* of an evaluation of the biquadratic coupling term with spacer layer thickness. As shown in FIG. 4B and FIG. 4C, the coupling through this RKKY spacer layer can be dependent on the thickness of the spacer layer. To ensure a sufficient stability of the reference layer magnetization, the thickness of the spacer can be sufficiently thin so that the net coupling energy is large enough compared to a Zeeman energy of the reference layer magnetization in the field from the media. This net coupling energy across the RKKY coupling layer can be above 1 $mJ/m^2$, for example.

Figure 4D:
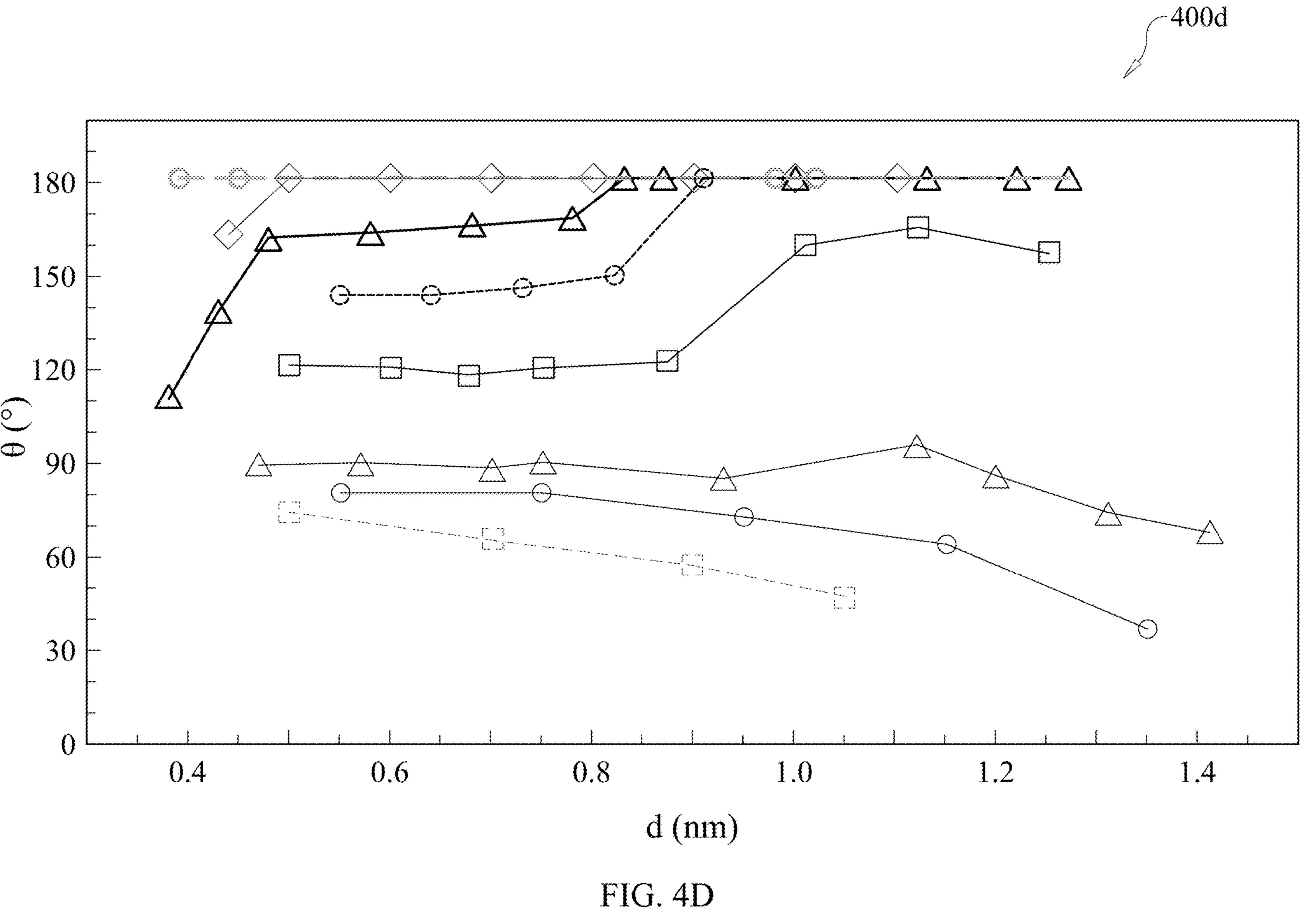
FIG. 4D provides a graphical representation of an example evaluation of the coupling angle versus RKKY coupling layer thickness as used in an embodiment.

FIG. 4D provides a graphical representation 400*d* of an example evaluation of the coupling angle versus spacer layer thickness. In some instances, the RRKY coupling layer can either be inserted at the interface between the reference layer or inserted inside the shield at a distance of 1 to a few nm from the interface with the read gap. This distance may not be too large, as the shield behavior can be modified in a part of the shield between the RRKY layer and the read gap.

Figure 5A:
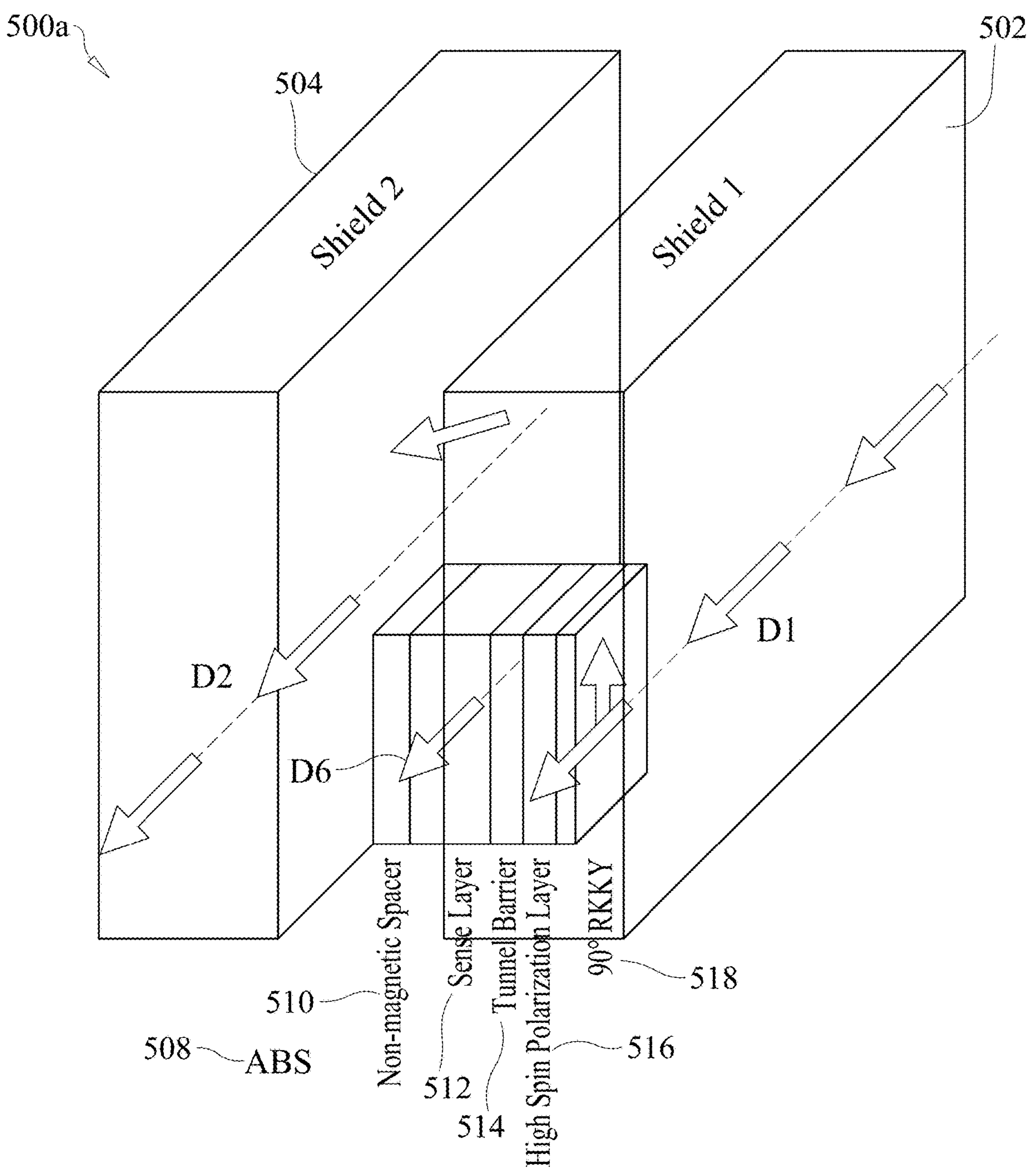
FIG. 5A illustrates an example MR head with a RKKY layer located in the read gap and patterned at a same dimension as the MR pillar according to an embodiment.
Figure 5B:
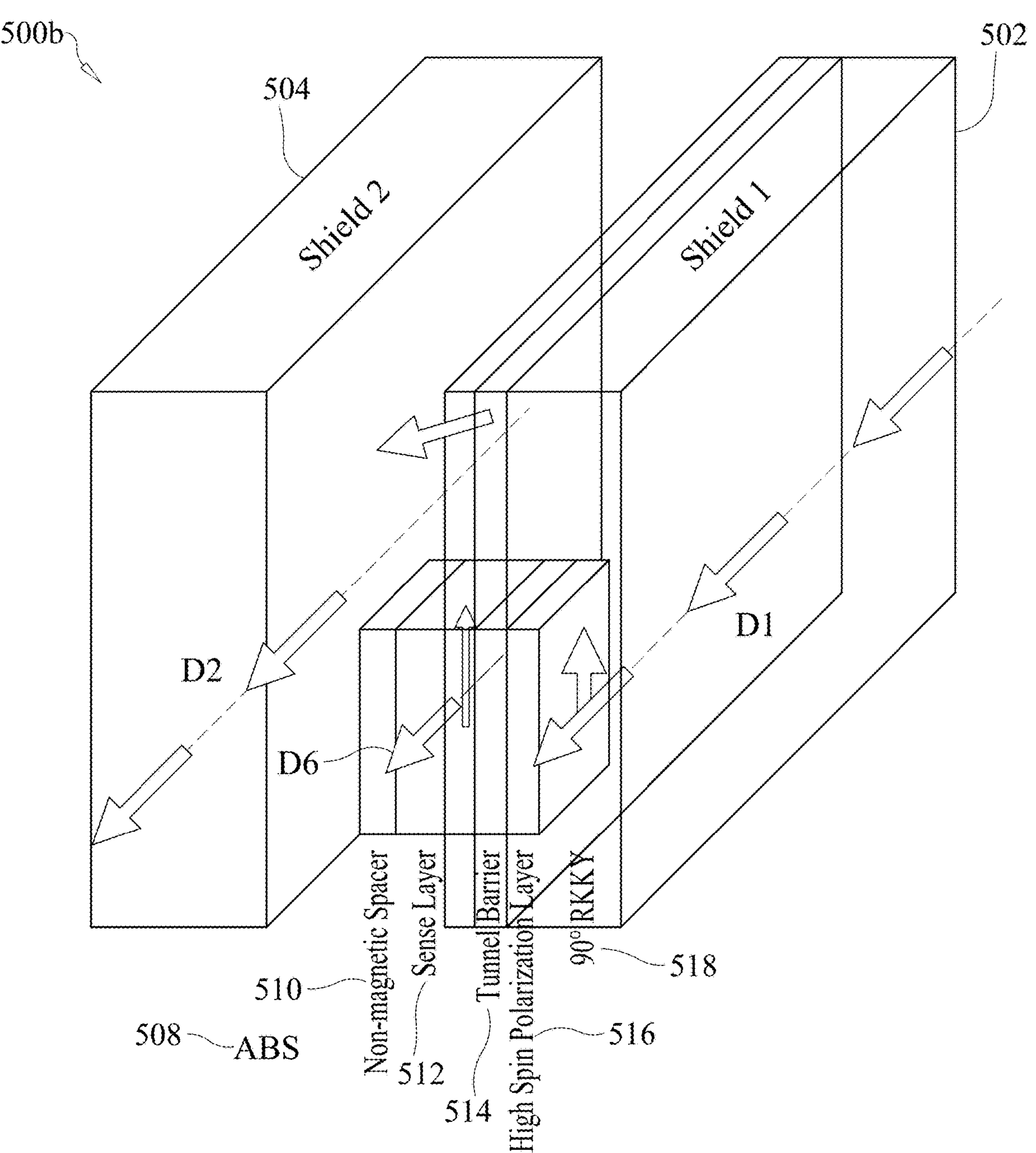
FIG. 5B illustrates an example MR head with a RKKY coupling layer disposed at the shield adjacent to a surface of the shield in contact with the read gap according to an embodiment.

FIGS. 5A-5B illustrate embodiments of a MR head with a RKKY coupling layer added between a reference layer and a core part of a first shield. FIG. 5A illustrates a MR head 500*a* with a RKKY layer 518 located in the read gap (e.g., a gap defined between shields 502, 504) and patterned at a same dimension as the MR pillar. As shown in FIG. 5A, the RKKY coupling layer 518 can be disposed between a high spin polarization layer 516 and shield 1 502. In FIG. 5A, the RKKY coupling layer 518 can be chosen to induce a 90° coupling between the shield and the high spin polarization layer (e.g., 516) so that the magnetization of the high spin polarization layer is oriented roughly in the direction perpendicular to the media while the magnetization of the shield is oriented roughly along the cross-track direction (direction D1 in FIG. 5A). In this case, the sense layer magnetization (e.g., 512) can be biased roughly along the cross-track direction as represented by direction D6 in FIG. 5A. Further, in FIG. 5A, the MR head 500*a* can include a non-magnetic spacer 510 between shield 504 and sense layer 512, and a tunnel barrier 514 between the sense layer 512 and high spin polarization layer 516. A bottom surface adjacent to a magnetic recording medium can form an air-bearing surface (ABS) 508.

FIG. 5B illustrates a MR head 500*b* with a RKKY coupling layer 518 disposed within the shield 502 adjacent to a surface of the shield in contact with the read gap. As shown in FIG. 5B, the RKKY coupling layer 518 can be inserted in the first shield 502 such that the coupling layer 518 is recessed inside shield 502.

In some embodiments, the MR element can include a double magnetic tunnel junction. A second spacer layer separating the sense layer from a second shield (Shield 2) can be replaced by a tunnel barrier. The tunnel barrier can comprise a material such as MgO. In order to minimize the head noise and the device resistance, these barriers (both barriers) can have low resistance area product, which can be below 1 $\Omega\cdot\mu m^2$ or preferably below 0.5 $\Omega\cdot\mu m^2$ while providing a large TMR amplitude, such as above 50% or preferably above 80%. In these embodiments, the two tunnel junctions can be considered as connected in series so that their resistance can add up as well as the absolute change of resistance ΔR associated with the variation of field from media.

The relative TMR (i.e., ΔR/R) can remain about the same as for a single barrier. In order for the second tunnel barrier to also provide a large TMR signal, a thin FeCoB layer and a B absorbing thin layer (such as Ta, W, Mo, typically ~0.3 nm thick) can be added between the second tunnel barrier (MgO) and the second shield. In the growth of MgO-based magnetic tunnel junctions, adding these layers enable to cope with the change of crystallographic structure between the shields which can be made of a material with a fcc crystallographic structure having 3-fold symmetry and the MgO barrier and surrounding magnetic electrodes which have a bcc structure with 4-fold symmetry.

Figure 6:
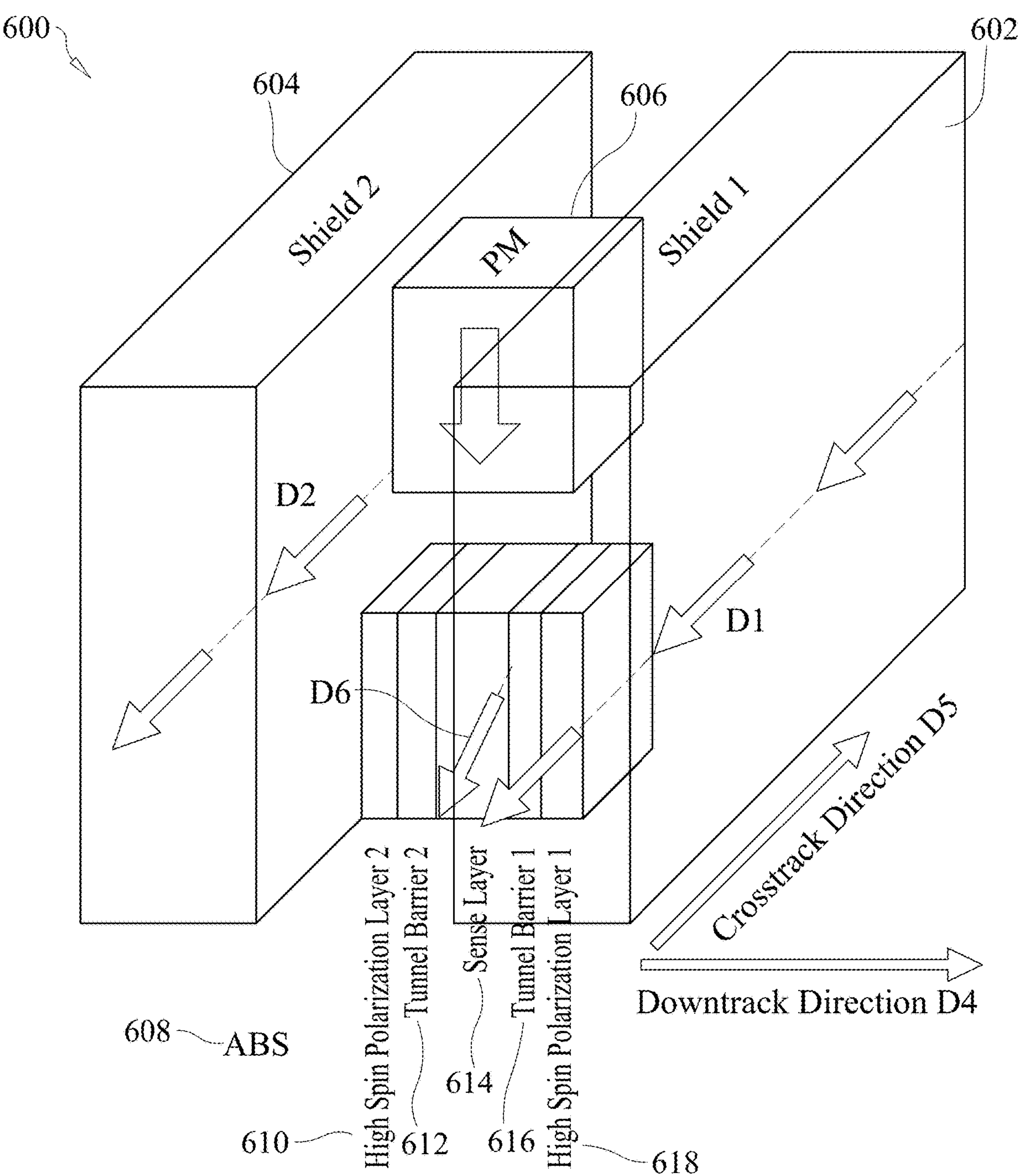
FIG. 6 provides an example shielded MR head with a double magnetic tunnel junction according to an embodiment.

FIG. 6 provides a shielded MR head 600 with such double magnetic tunnel junction. The double magnetic tunnel junction can include multiple tunnel barriers (tunnel barrier 1 (616), tunnel barrier 2 (612)) between shields 602, 604. In some instances, a high spin polarization layer 2 (610) (FeCoB for instance) can be inserted in the gap of the MR head as part of the patterned pillar or can be at the surface of the shield. A high spin polarization layer 618 can be disposed between shield 602 and tunnel barrier 616.

The embodiment as described in FIG. 6 can include a sense layer 614 biased at 45° downwards by a permanent magnet (PM) 606. In some embodiments, a RKKY coupling layer such as FeRu can be added to orient the magnetization of both reference layers in the direction roughly perpendicular to the media while the sense layer magnetization can be biased along the cross-track direction.

Figure 7:
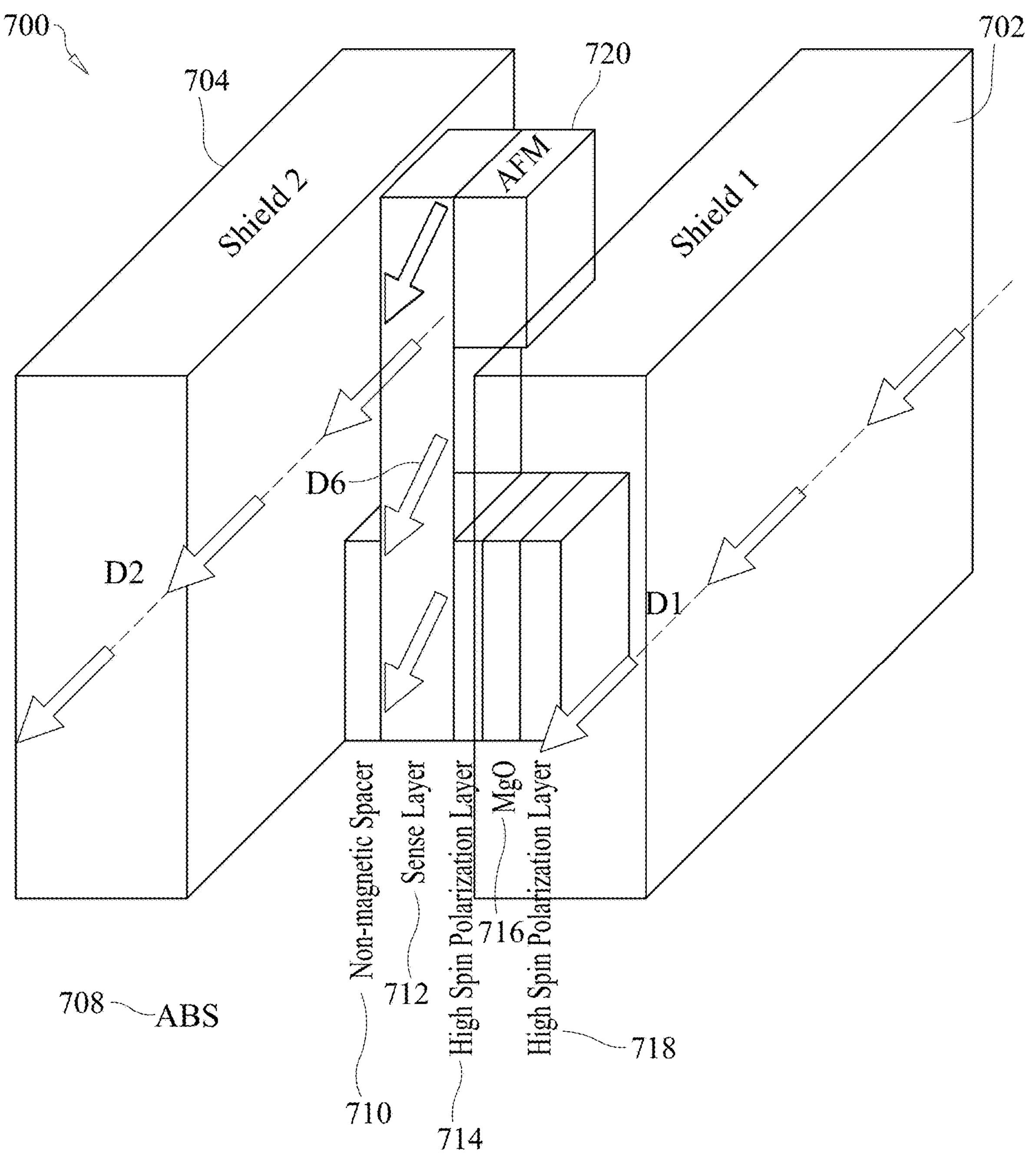
FIG. 7 illustrates an example MR head with a sense layer biased by a recessed antiferromagnetic layer according to an embodiment.

In some embodiments, the sense layer can be biased at an angle. The MR head can include a recessed antiferromagnetic layer to be pinned to the reference layer. The recessed antiferromagnetic layer can bias the sense layer magnetization at an angle. FIG. 7 illustrates an example MR head 700 with a sense layer biased by a recessed antiferromagnetic layer.

As shown in FIG. 7, no permanent magnet may need to be included in the MR head 700. The sense layer 712 can be extended in the vertical direction (along the gap height i.e., perpendicular to the media plane) and disposed between shields 702, 704. The direction of biasing of the sense layer magnetization can be set by a balance between the interlayer coupling with the shield 704 through an adjacent non-magnetic spacer 710 (tunnel barrier or metallic spacer layer), the interlayer coupling through the tunnel barrier 716, the shape anisotropy of the sense layer and the remote exchange bias with the antiferromagnetic layer. A high spin polarization layer 718 can be disposed between shield 702 and tunnel barrier layer 716. The exchange bias energy may be tuned if needed by inserting a thin layer of a non-magnetic element such as Cu, Ta, W, Mo at the interface between the antiferromagnetic material 720 and the sense layer 712. For processing reasons, another high spin polarization layer 714 can be added (e.g., FeCoB) associated with a thin B absorbing layer at the interface between the MgO barrier 716 and the extended part of the sense layer 712. In some instances, biasing the sense layer 712 by a recessed AFM 720 can be combined with using double magnetic tunnel junction.

In a further embodiment, current-perpendicular-to-plane giant magnetoresistance (GMR) spin-valves can be used instead of a magnetic tunnel junction. For instance, a GMR spin-valve can be used if a tunnel junction resistance becomes too high as the device size shrinks. In such embodiments, the whole stack can be made of metallic elements. Heusler based spin-valves with an Ag spacer layer can be used as CPP spin-valves.

As described above, the present embodiments relate to magneto-resistive read heads that can utilize read shields to maintain a reference layer magnetization. A first example embodiment provides a magneto-resistive head. The magneto-resistive head can include a first shield (e.g., 102 in FIG. 1) and a second shield (e.g., 104 in FIG. 1) disposed adjacent to the first shield. The first shield and the second shield can include a magnetic material. The shields can be made of soft magnetic material whose function is to absorb the flux from further bits down track so that the magneto-resistive layer is primarily impacted by the magnetic flux from the bit located right under it at the air bearing surface (ABS). A distance between the first shield and the second shield can form a read gap. In some instances, the distance between the first shield and the second shield can be less than 10 nanometers The magneto-resistive head can also include a first spacer layer (e.g., 114 in FIG. 1) disposed in the read gap. If the magneto-resistive head uses tunnel magnetoresistance, the first spacer layer can include a tunnel barrier. Further, if the magneto-resistive head uses giant magnetoresistance, the first spacer layer can be metallic.

The magneto-resistive head can also include a first reference layer disposed in the read gap adjacent to the first spacer layer. In some instances, the first reference layer comprises the first shield. In other instances, the first reference layer includes a polarization layer (e.g., 116 in FIG. 1) comprising a first metallic alloy comprising Boron or a second metallic alloy comprising an amorphizing element. Further, a first reference layer magnetization direction can be set based at least by a first shield magnetization direction (e.g., D1 in FIG. 1).

The magneto-resistive head can also include a sense layer (e.g., 112 in FIG. 1) disposed in the read gap between the first spacer layer (e.g., 114 in FIG. 1) and the second shield (e.g., 104 in FIG. 1). The sense layer can include a bias magnetization direction (e.g., D6 in FIG. 1). The bias direction can be around 45° or 135° or −45° or −135° relative to the first shield magnetization direction (e.g., D1 in FIG. 1). In some instances, the bias direction is set at least by a coupling between the sense layer and the first reference layer, and a magnetic field generated by a permanent magnet disposed in the read gap.

In some instances, magneto-resistive head can include a second spacer layer disposed in the read gap adjacent to the sense layer. As an example, as shown in FIG. 6, a first spacer layer can include tunnel barrier 1 (616), and a second spacer layer can include tunnel barrier 2 (612). In such instances, the magneto-resistive head can also include a second reference layer (e.g., polarization layer 2 610 in FIG. 6) disposed in the read gap between the second spacer layer (e.g., 612 in FIG. 6) and the second shield (e.g., 604 in FIG. 6). A second reference layer magnetization direction can be set at least by a second shield magnetization direction (e.g., D2 in FIG. 6).

In some instances, the magneto-resistive head can further include a coupling layer disposed between the first shield and the first reference layer. An example coupling layer can include RRRY 518 as shown in FIGS. 5A-5B, for example. The coupling between the sense layer and the first reference layer can be modified by the coupling layer. For instance, the coupling layer can produce a Ruderman-Kittel-Kasuya-Yosida (RKKY) interlayer coupling between the first shield and the first reference layer. In some instances, such as RKKY 518 as shown in FIG. 5B, the coupling layer can be recessed within the first shield.

In some embodiments, the magneto-resistive head can further include a recessed antiferromagnetic material (AFM) (e.g., 720 in FIG. 7) disposed in the read gap, wherein the sense layer (e.g., 712 in FIG. 7) can be extended along a height of the read gap.

In a second example embodiment, a head for interacting with a magnetic recording medium is provided. The head can include a first shield and a second shield disposed adjacent to the first shield. Each of the first shield and the second shield can include a magnetic material.

Further, a distance between the first shield and the second shield can form a read gap. The head can also include a first spacer layer disposed in the read gap. The first spacer layer can comprise a tunnel barrier or a metallic layer. Further, a magnetization direction of a first reference layer can be set based at least by a first shield magnetization direction. The head can also include a sense layer disposed in the read gap between the first spacer layer and the second shield.

In a third example embodiment, a magneto-resistive head is provided. The magneto-resistive head can include a first shield and a second shield disposed adjacent to the first shield. A distance between the first shield and the second shield can form a read gap.

The magneto-resistive head can also include a first spacer layer disposed in the read gap and a first reference layer disposed in the read gap adjacent to the first spacer layer. A first reference layer magnetization direction can be set based at least by a first shield magnetization direction. The magneto-resistive head can also include a sense layer disposed in the read gap between the first spacer layer and the second shield.

The magneto-resistive head can also include a second spacer layer disposed in the read gap adjacent to the sense layer. The magneto-resistive head can also include a second reference layer disposed in the read gap between the spacer layer and the second shield. A second reference layer magnetization direction is set at least by a second shield magnetization direction.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A magneto-resistive head comprising:
- a first shield;
- a second shield disposed adjacent to the first shield, each of the first shield and the second shield comprising a magnetic material, and a distance between the first shield and the second shield forming a read gap, wherein a magnetization of the first shield and the second shield are substantially parallel with one another, and wherein the distance between the first shield and the second shield is less than 10 nanometers;
- a first spacer layer disposed in the read gap, the first spacer layer comprising a non-magnetic material;
- a first reference layer disposed in the read gap between the first spacer layer and the first shield;
- a coupling layer disposed between the first shield and the first reference layer, wherein the coupling layer produces a Ruderman-Kittel-Kasuya-Yosida (RKKY) interlayer coupling at an angle of about 90 degrees relative to the magnetization of the first shield;
- a sense layer disposed in the read gap between the first spacer layer and the first reference layer, wherein a sense layer magnetization direction is biased relative to the magnetization of the first shield along a cross-track direction; and
- a second spacer layer disposed in the read gap between the sense layer and the first reference layer, wherein the magneto-resistive head uses tunnel magnetoresistance, and the second spacer layer comprises a tunnel barrier.

2. The magneto-resistive head of claim 1, wherein the first reference layer includes a polarization layer comprising a first metallic alloy comprising B or another amorphizing element.

3. The magneto-resistive head of claim 1, wherein the coupling layer is recessed within the first shield.

4. A head for interacting with a magnetic recording medium, the head comprising:
- a first shield;
- a second shield disposed adjacent to the first shield, each of the first shield and the second shield comprising a magnetic material, and a distance between the first shield and the second shield forming a read gap, wherein a magnetization of the first shield and the second shield are substantially parallel with one another, and wherein the distance between the first shield and the second shield is less than 10 nanometers;
- a first spacer layer disposed in the read gap, the first spacer layer comprising a tunnel barrier or a metallic layer;
- a first reference layer disposed in the read gap between the first spacer layer and the first shield;
- a coupling layer disposed between the first shield and the first reference layer, wherein the coupling layer produces a Ruderman-Kittel-Kasuya-Yosida (RKKY) interlayer coupling at an angle of about 90 degrees relative to the magnetization of the first shield;
- a sense layer disposed in the read gap between the first spacer layer and the first reference layer, wherein a sense layer magnetization direction is biased relative to the magnetization of the first shield along a cross-track direction; and
- a second spacer layer disposed in the read gap between the sense layer and the first reference layer, wherein the head uses tunnel magnetoresistance, and the second spacer layer comprises a tunnel barrier.

5. The head of claim 4, further comprising:

a polarization layer disposed between the first spacer layer and the first shield, the polarization layer comprising a first metallic alloy comprising Boron or another amorphizing element, and the first reference layer comprises the polarization layer.

* * * * *